United States Patent
Heinzl

(10) Patent No.: US 10,238,988 B2
(45) Date of Patent: Mar. 26, 2019

(54) CRYSTALLIZATION SYSTEM AND PROCESS

(71) Applicant: Major Bravo Limited, Tortola (VG)

(72) Inventor: Wolfgang Heinzl, Ramerberg (DE)

(73) Assignee: Major Bravo Limited, Tortola (VG)

(*) Notice: Subject to any disclaimer, the term of this patent is extended or adjusted under 35 U.S.C. 154(b) by 339 days.

(21) Appl. No.: 14/392,247

(22) PCT Filed: Jun. 24, 2013

(86) PCT No.: PCT/EP2013/063161
§ 371 (c)(1),
(2) Date: Dec. 24, 2015

(87) PCT Pub. No.: WO2014/206442
PCT Pub. Date: Dec. 31, 2014

(65) Prior Publication Data
US 2016/0193544 A1    Jul. 7, 2016

(51) Int. Cl.
*B01D 9/00* (2006.01)
*B01D 61/36* (2006.01)

(52) U.S. Cl.
CPC ......... *B01D 9/0031* (2013.01); *B01D 9/0018* (2013.01); *B01D 9/0022* (2013.01);
(Continued)

(58) Field of Classification Search
CPC .. B01D 9/0031; B01D 9/0022; B01D 61/364; B01D 9/0072; B01D 9/0018;
(Continued)

(56) References Cited

U.S. PATENT DOCUMENTS 4,476,024 A    10/1984 Cheng
9,656,883 B2 *  5/2017 Heinzl ................... B01D 61/00
(Continued)

FOREIGN PATENT DOCUMENTS

CN    1121112 A    4/1996
CN    1552638 A    12/2004
(Continued)

OTHER PUBLICATIONS

Banff May 12-14, 2013 Slides.*
(Continued)

*Primary Examiner* — Pamela H Weiss
(74) *Attorney, Agent, or Firm* — Mintz Levin Cohn Ferris Glovsky and Popeo, P.C.; Peter F. Corless; Steven M. Jensen

(57) ABSTRACT

A system for the crystallization of a substance to be crystallized which is dissolved in a solvent, comprising a crystallization apparatus which is flowed through by a solution to be concentrated which has the substance to be crystallized dissolved therein, and by a heating steam or a heating liquid, wherein the crystallization apparatus has at least one flow passage conducting the solution to be concentrated, at least one flow passage conducting the heating steam or the heating liquid, and at least one flow passage conducting vaporous solvent, wherein a respective flow passage conducting the solution to be concentrated is at least partly separated from a respective flow passage conducting the heating steam or the heating liquid by a steam-impermeable and liquid-impermeable wall and wherein a respective flow passage conducting the solution to be concentrated is at least partly separated from a respective flow passage conducting the vaporous solvent by a membrane wall permeable to the vaporous solvent, but not to the liquid solvent, wherein the crystallization apparatus is configured such that the solution to be concentrated is boiled in the respective flow passage conducting the solution to be concentrated and vaporous
(Continued)

Figure 1:
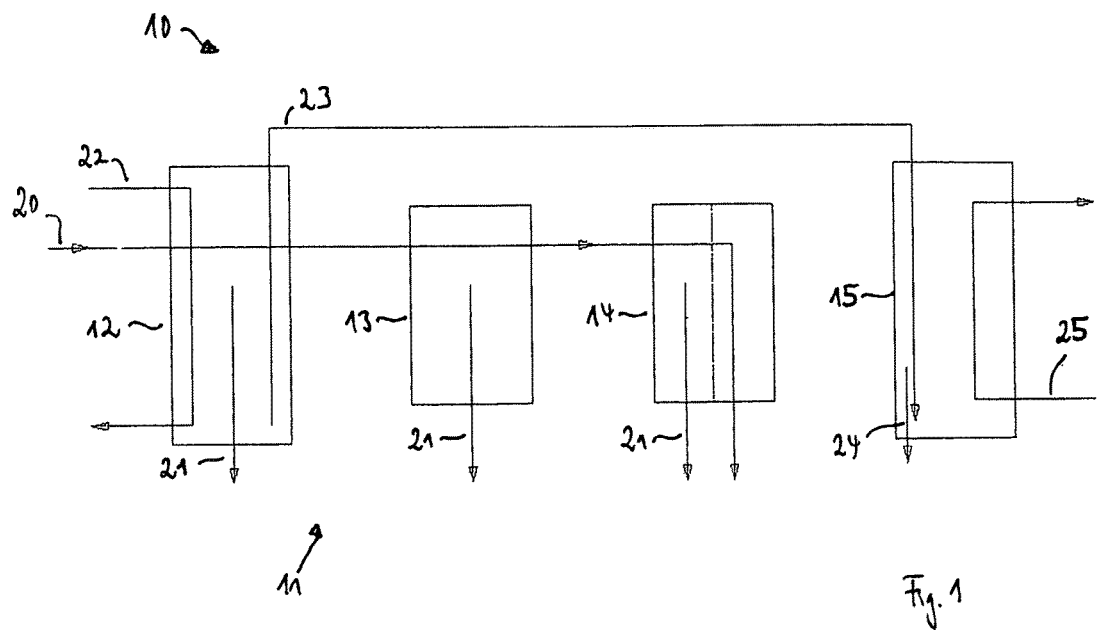

solvent produced during the boiling moves through the membrane wall into the adjacent flow passage conducting the vaporous solvent.

10 Claims, 6 Drawing Sheets

(52) U.S. Cl.
CPC ......... *B01D 9/0072* (2013.01); *B01D 61/364* (2013.01); *B01D 2009/0086* (2013.01); *B01D 2311/2642* (2013.01); *B01D 2313/38* (2013.01)

(58) Field of Classification Search
CPC ........ B01D 2313/38; B01D 2009/0086; B01D 2311/2642
See application file for complete search history.

(56) References Cited

U.S. PATENT DOCUMENTS

2009/0000939 A1\* 1/2009 Heinzl ................. B01D 61/364
203/80

| | | | |
|---|---|---|---|
| 2012/0038069 | A1 | 2/2012 | Heinzl et al. |
| 2013/0264260 | A1 | 10/2013 | Heinzl |
| 2014/0216916 | A1 | 8/2014 | Heinzl |

FOREIGN PATENT DOCUMENTS

| | | | | |
|---|---|---|---|---|
| CN | 201823337 U | 5/2011 | | |
| DE | 102009020128 A1 | 11/2010 | | |
| DE | 102011108909 A1 | 1/2013 | | |
| GB | 2146911 A | 5/1985 | | |
| WO | 2005/089914 A1 | 9/2005 | | |
| WO | 2012/062392 A1 | 5/2012 | | |
| WO | WO 2012062392 A1 \* | 5/2012 | ............. | B01D 61/00 |

OTHER PUBLICATIONS

WO 2012/062392A1 Machine Translation (Apr. 2018).\*
Schwarzer, Hans C. and Peukert, Wolfgang "Prediction of aggregation kinetics based on surface properties of nanoparticles", Chemical Engineering Science 60, Jan. 2005, pp. 1-25, United States.

\* cited by examiner

CRYSTALLIZATION SYSTEM AND PROCESS

CROSS-REFERENCE TO RELATED APPLICATIONS

This application is a 35 U.S.C. § 371 U.S. national entry of International Application PCT/EP2013/063161 (WO2014/206442 A1) having an international filing date of Jun. 24, 2013. The entire contents are incorporated herein by reference in its entirety.

The present invention relates to a system and to a method for the crystallization of a substance, in particular of a salt, to be crystallized which is dissolved in a solvent.

The crystallization can have various areas of use, for example for pure and ultrapure substance extraction inter alia for pharmaceutics; fractional crystallization for the precipitation of two or more substances present in a solution; and the reduction of the volume of a solution containing a salt or salts as well as the extraction of the salt(s) through crystallization.

If crystals are to be produced from a solution having a substance dissolved therein, the solution has to be concentrated, that is at least some of the solvent has to be removed, for example evaporated. Saturation, oversaturation and finally crystallization occur due to the removal of solvent. The part removal of the solvent, for example by means of evaporation, always has a high energy expenditure. Energy-saving possibilities for concentrating a solution include, for example, multi-effect evaporation. Multi-effect evaporation can furthermore be combined both with a thermal vapor recompression evaporator and a mechanical vapor recompression evaporator.

Good heat transfer is always necessary for the use of vapor recompression evaporators. The heat in this respect has to be transferred via a flow passage conducting the solution to be concentrated. The flow passage is bounded at one side by a solution-impermeable, steam-impermeable surface and at the other side by a solvent-impermeable, steam-permeable membrane wall. If solvent is removed from the solution to be concentrated via the membrane wall, saturation as well as oversaturation of the solution and finally crystallization take place. To achieve a heat transfer via the flow passage which is as high as possible, the flow passage via which the heat is to be transferred has a width which is as small as possible in conventional crystallization apparatus.

The flow passages flowed through by the solution to be concentrated are typically held open by spacing grids, so-called spacers. The spacing grids are in particular necessary if the solvent-impermeable, steam-impermeable surfaces and the solvent-impermeable, steam-permeable membrane walls comprise plastics or if the flow passages are at different absolute pressures. When crystallization occurs, crystals can be deposited in the spacing grids in the thin flow passages and can block the flow passage or damage the membrane wall. If the membrane wall is microporous and if crystallization takes place at the membrane wall, this can result in a growing of the crystals through the membrane wall. As a consequence, the solution to be concentrated can move via the crystals which have grown through the membrane wall into the adjacent flow passage.

Document GB 2 146 911 A describes a method for the separation of liquid mixtures or solutions with the aid of a porous dividing wall. Document DE 10 2011 108 909 A1 describes a membrane distillation apparatus.

It is the underlying object of the invention to provide an improved system for the crystallization of a substance to be crystallized which is dissolved in a solvent, the system ensuring a reliable and efficient crystallization without the flow passages being blocked by crystals or a growing of the crystals through the membrane wall occurring. A corresponding method should furthermore be set forth.

The object underlying the invention is satisfied by a system for the crystallization of a substance, in particular of a salt, to be crystallized which is dissolved in a solvent, said system having a crystallization apparatus flowed through by a solution to be crystallized which comprises the solvent having the substance to be crystallized dissolved therein and by a heating steam or a heating liquid.

The crystallization apparatus includes at least one flow passage which conducts the solution to be concentrated, at least one flow passage conducting the heating steam or the heating liquid and at least one flow passage conducting the vaporous solvent. A respective flow passage conducting the solution to be concentrated is at least partly separated from a respective flow passage conducting the heating steam or the heating liquid by a steam-impermeable and liquid-impermeable wall. A respective flow passage conducting the solution to be concentrated is furthermore at least partly separated from a respective flow passage conducting the vaporous solvent by a membrane wall permeable to the vaporous solvent, but not to the liquid solvent.

The crystallization apparatus is configured such that heat is transferred during the operation of the crystallization apparatus through the steam-impermeable and liquid-impermeable wall from the heating steam or the heating liquid to the solution to be concentrated and the solution to be concentrated is boiled in the respective flow passage conducting the solution to be concentrated. The vaporous solvent produced during boiling moves through the membrane wall into the adjacent flow passage conducting the vaporous solvent. This has the consequence that the solvent is removed from the solution to be concentrated. Nucleation and crystallization begin due to the increasing concentration of the dissolved substance to be crystallized in the solution to be concentrated.

A high heat transfer via the flow passage conducting the solution to be concentrated is advantageously achieved by the boiling of the solution to be concentrated. The boiling furthermore has the result that the membrane wall and the steam-impermeable and liquid-impermeable wall move and the crystals which have formed at the surfaces of the membrane wall and of the steam-impermeable and liquid-impermeable wall during the increasing concentration of the solution release from the surfaces or do not adhere as much. The crystals are deposited due to the density difference of the crystals from the solution to be concentrated. Furthermore, temperature gradients and concentration gradients, which are in particular formed at the membrane wall, are reduced by the boiling of the solution to be concentrated.

The steam-permeable, liquid-impermeable membrane wall can be the wall of a hollow fiber or of a pipe or an areal element. The crystallization apparatus can, for example, be structured as a hollow fiber bundle or pipe bundle, a plate module or a winding module. The membrane wall can, for example, be manufactured from microporous, hydrophobic substances, for example from polytetrafluorethylene, polypropylene, polyethylene or polyvinylidene fluoride.

To effect a boiling of the solution to be concentrated in the respective flow passage, the hydrostatic pressure of the solution to be concentrated is preferably set, in particular lowered, such that the boiling pressure is reached which corresponds to the temperature of the solution to be concentrated. For this purpose, the crystallization apparatus is operated at a vacuum or at an excess pressure with respect to the environmental pressure present outside the crystallization apparatus. To separate the crystallization apparatus from the environmental pressure, measures familiar to the skilled person have to be taken, such as the use of valves in the supply lines and drain lines. Pumps can furthermore in particular be used to produce the desired pressure in the flow passages.

In accordance with a preferred embodiment, a lower pressure is present in the at least one flow passage conducting the vaporous solvent than in the at least one flow passage conducting the heating steam or the heating liquid. The at least one flow passage conducting the vaporous solvent is preferably at the boiling pressure of the solution to be concentrated adjacent via the membrane wall, said boiling pressure being corrected downward by the amount of the pressure loss caused by the membrane wall.

In conventional crystallization apparatus, the width of the flow passage conducting the solution to be concentrated is typically as small as possible to ensure a good heat transfer via the flow passage. The width is typically in the range from 0.5 to 1 mm. In accordance with the invention, the flow passage conducting the solution to be concentrated has a width of at least 3 mm and in particular of no more than 10 mm. The width of the flow passage conducting the solution to be concentrated can also in particular amount to at least 4 mm or 5 mm. The probability that the flow passage is blocked by crystals is reduced by the increased width of the flow passage conducting the solution to be concentrated. A good heat transfer via the flow passage conducting the solution to be concentrated is ensured in the crystallization apparatus in accordance with the invention despite the increased width of the flow passage due to the boiling of the solution to be concentrated.

In accordance with the invention, a sediment collection tank adjoins a respective flow passage conducting the solution to be concentrated at the bottom, in which sediment collection tank the sediment, i.e. the crystals produced, are collected. The sediment collection tank is advantageously filled with the solution to be concentrated, but is not flowed through by the solution to be concentrated. An outlet can be provided at the lower region of the sediment collection tank via which the sediment collection tank can, for example, be sensor-monitored or emptied.

In the event that some of the solution to be concentrated moves through the membrane wall in liquid form due to leakage, in accordance with a preferred embodiment, a liquid collection tank is provided at the bottom at a respective flow passage conducting the vaporous solvent for the collection of the solution to be concentrated which has moved into the respective flow passage conducting the vaporous solvent. The liquid collection tank and the sediment collection tank are in particular separated from one another by a separating wall.

So that the solution to be concentrated which has moved into the liquid collection tank can be used again at least in part for concentrating, in an embodiment of the invention, the liquid collection tank is connected to the at least one flow passage conducting the solution to be concentrated.

To be able to process larger volume flows, the crystallization apparatus advantageously comprises a plurality of mutually parallel flow passages conducting the solution to be concentrated, a plurality of mutually parallel flow passages conducting the heating steam or the heating liquid as well as a plurality of mutually parallel flow passages conducting the vaporous solvent. With a predefined volume flow, the flow speed of the solution to be concentrated can be set via the number of the flow passages connected in parallel and the kinetics of the crystallization can thus also be influenced.

In this respect, two flow passages conducting the solution to be concentrated are advantageously associated with at least one of the flow passages conducting the heating steam or the heating liquid. The two flow passages conducting the solution to be concentrated can be arranged at oppositely disposed sides of the respective flow passage conducting the heating steam or the heating liquid. A respective steam-impermeable and liquid-impermeable wall is arranged between the respective flow passages conducting the heating steam or the heating liquid or the solution to be concentrated.

Furthermore, two flow passages conducting the solution to be concentrated are advantageously associated with at least one of the flow passages conducting the vaporous solvent. The two flow passages conducting the solution to be concentrated can be arranged at oppositely disposed sides of the respective flow passage conducting the vaporous solvent. A respective steam-permeable, liquid-impermeable membrane wall is arranged between the respective flow passages conducting the vaporous solvent or the solution to be concentrated.

The number of the flow passages conducting the heating steam or the heating liquid and of the flow passages conducting the vaporous solvent can be reduced by the above-described measures.

Provision can be made that the crystallization apparatus has a plurality of stages connected after one another, wherein each stage has at least one flow passage conducting the solution to be concentrated, at least one flow passage conducting the heating steam or the heating liquid and at least one flow passage conducting the vaporous solvent. In this respect, the at least one flow passage conducting the vaporous solvent of one of the stages is connected to the at least one flow passage of the following stage conducting the heating steam or the heating liquid. Steam which forms in the at least one flow passage conducting the vaporous solvent of the one stage is used as heating steam in the following stage for heating the solution to be concentrated. If a heating liquid is used in a multi-stage crystallization apparatus, only the first stage is preferably heated by the heating liquid. The following stages are heated by heating steam which has in particular been formed in the respective preceding stage.

In accordance with a preferred embodiment, a respective deflection unit is arranged between adjacent stages and deflects the solution to be concentrated such that the solution to be concentrated enters into the stage following the deflection unit from below.

A preferred embodiment provides that the system in accordance with the invention comprises a compressor, for example a vapor recompression evaporator or a steam ejector. An inlet of the compressor is connected to an outlet of the at least one flow passage conducting the vaporous solvent and an outlet of the compressor is connected to an inlet of the at least one flow passage conducting the heating steam. The vaporous solvent whose temperature and pressure are increased by the compressor and which flows from the at least one flow passage conducting the vaporous solvent is thus supplied to the compressor. The heating steam thus produced is subsequently supplied to the at least one flow passage conducting the heating steam. On the use of a compressor, the crystallization apparatus is only heated by a heating steam and not by a heating liquid on the pressure side.

The above-described objective is furthermore satisfied by a method for the crystallization of a substance to be crystallized which is dissolved in a solvent, wherein a solution which is to be concentrated and which has the solvent having the substance to be crystallized dissolved therein, a heating steam or a heating liquid and vaporous solvent are guided through respective flow passages. A respective flow passage conducting the solution to be concentrated is at least partly separated from a respective flow passage conducting the heating steam or the heating liquid by a steam-impermeable and liquid-impermeable wall. A respective flow passage conducting the solution to be concentrated is furthermore at least partly separated from a respective flow passage conducting the vaporous solvent by a membrane wall permeable to the vaporous solvent, but not to the liquid solvent. The solution to be concentrated is boiled in the respective flow passage conducting the solution to be concentrated and the vaporous solvent produced during the boiling moves through the membrane wall into the adjacent flow passage conducting the vaporous solvent. A respective flow passage conducting the solution to be concentrated has a width of at least 3 mm. Sediment is collected in a sediment tank which adjoins a respective flow passage conducting the solution to be concentrated at the bottom.

Figure 2:
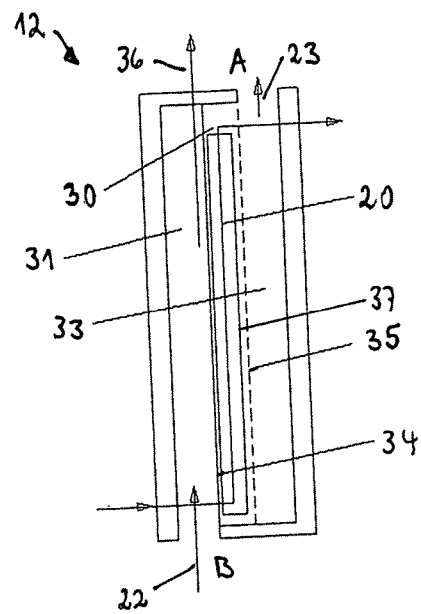
Figure 3:
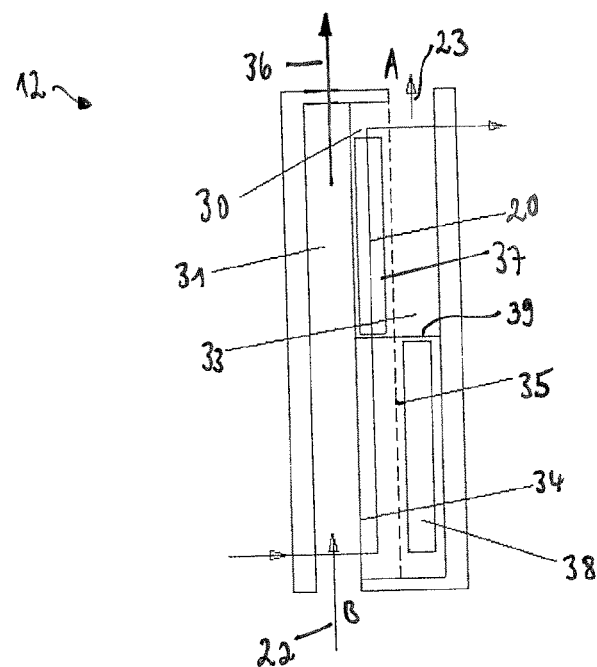
Figure 4:
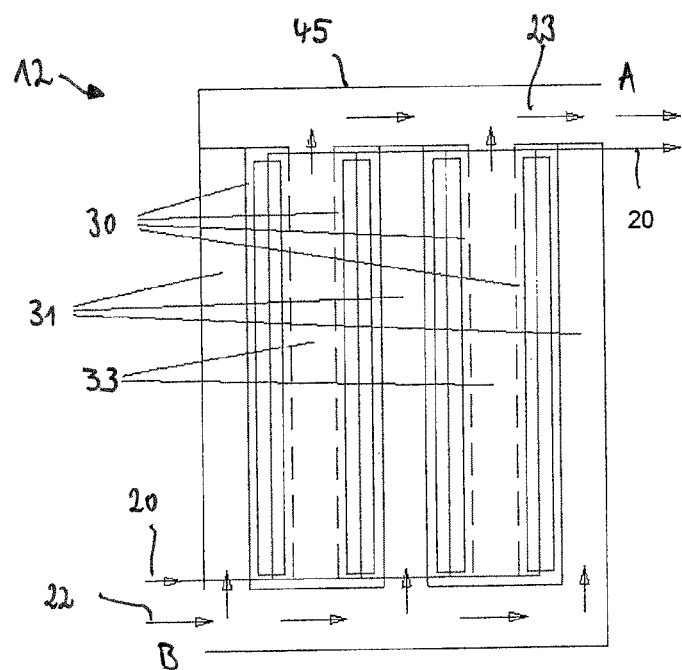
Figure 5:
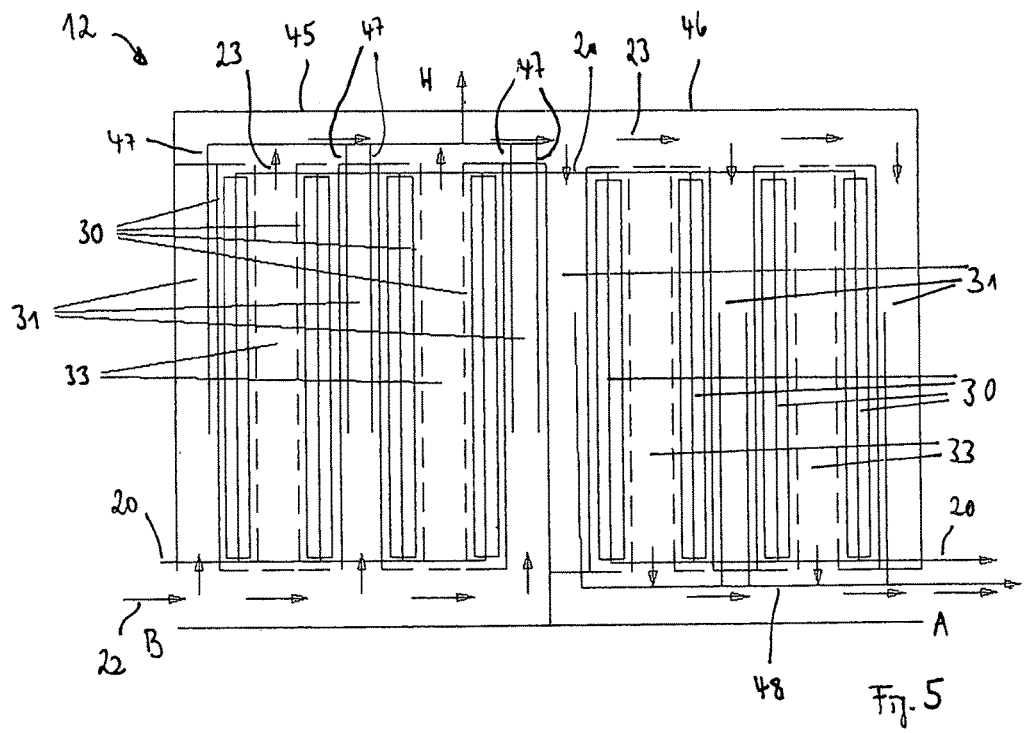
Figure 6:
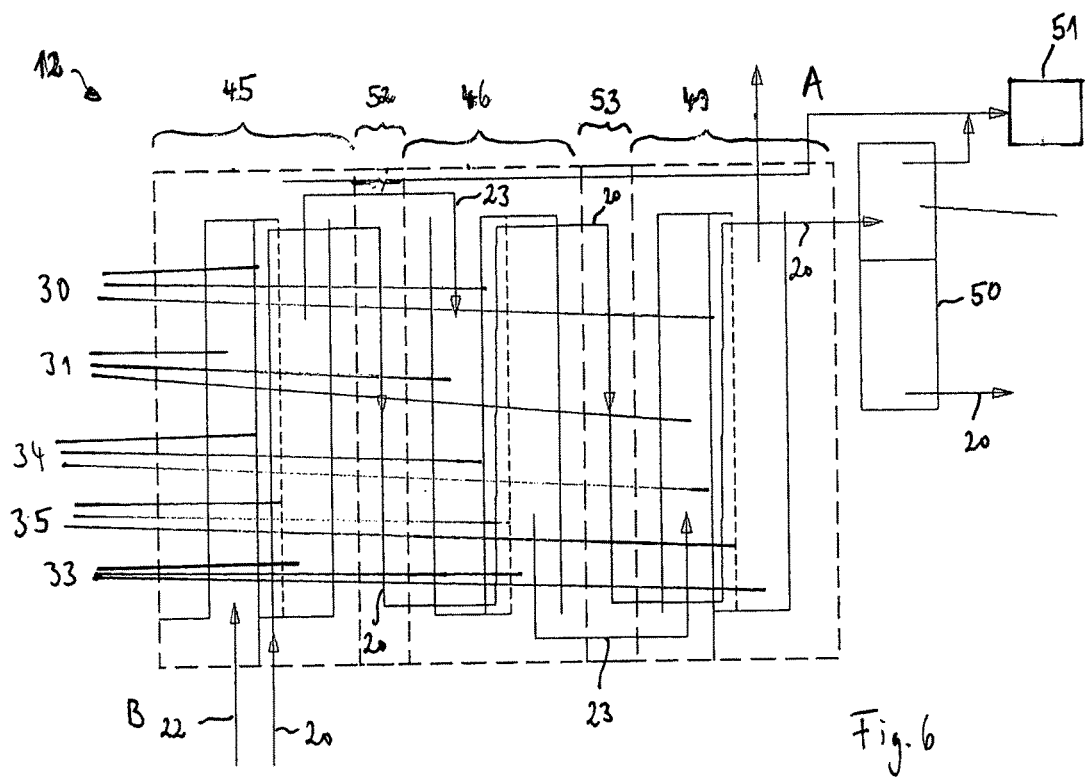
Figure 7:
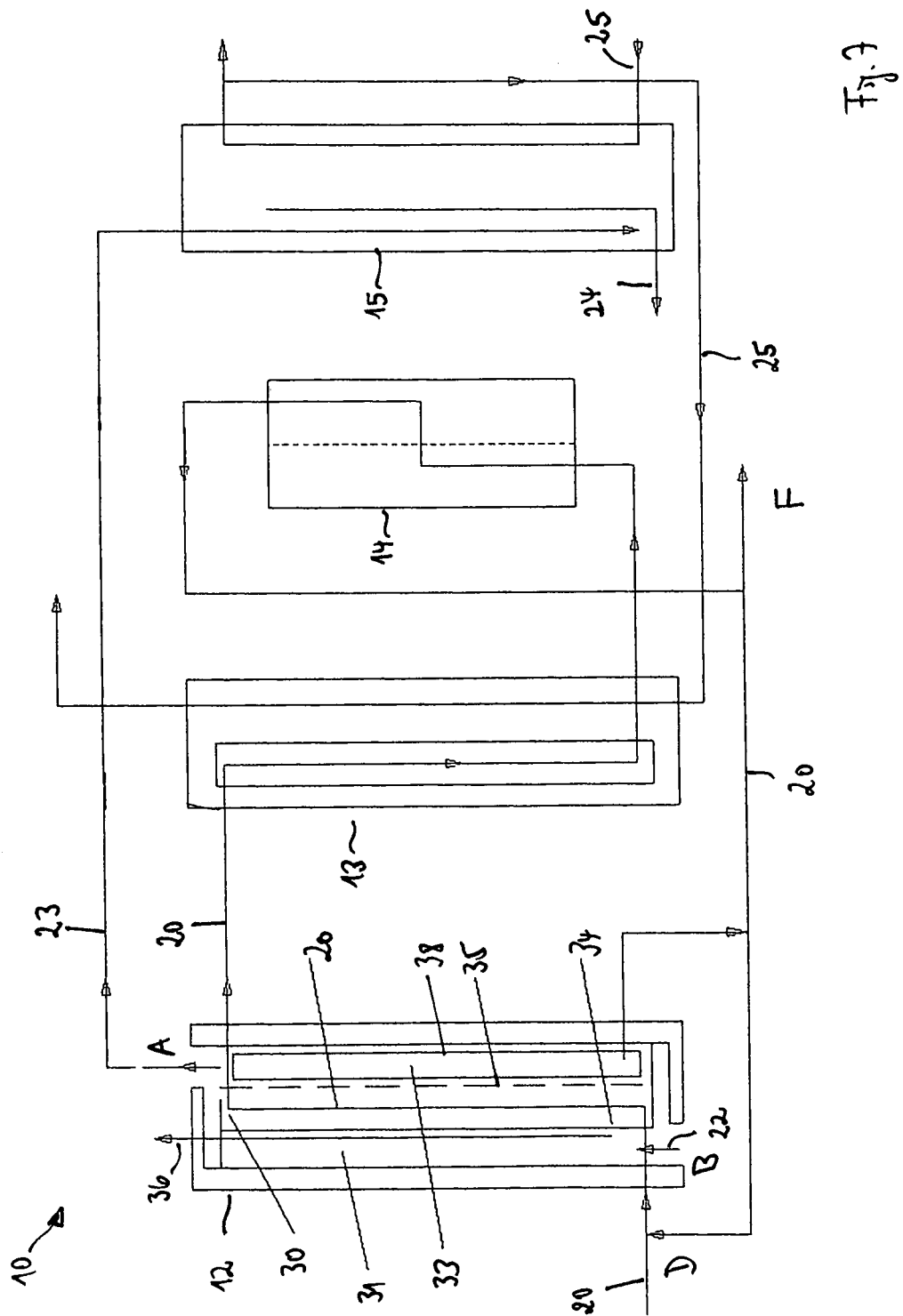
Figure 8:
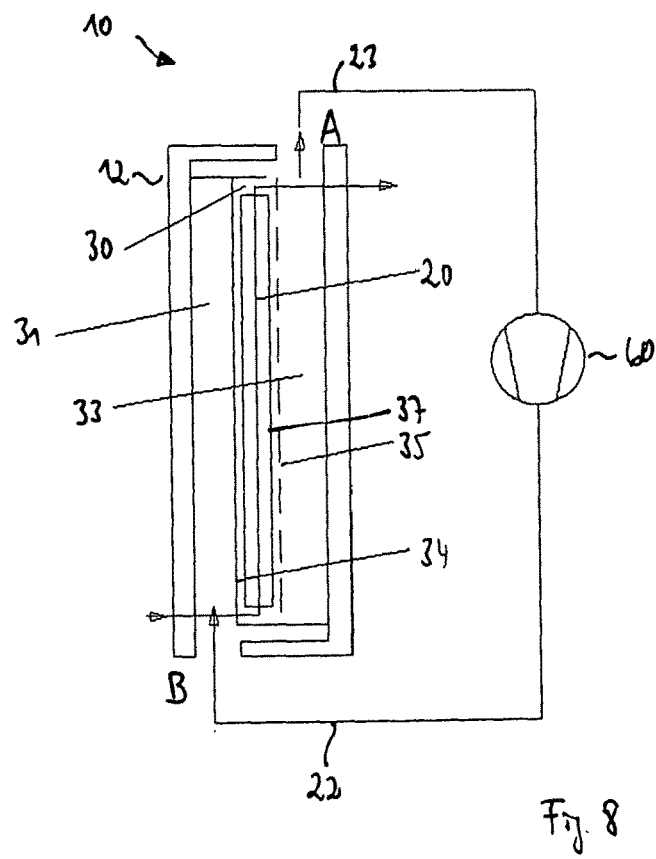
Figure 9:
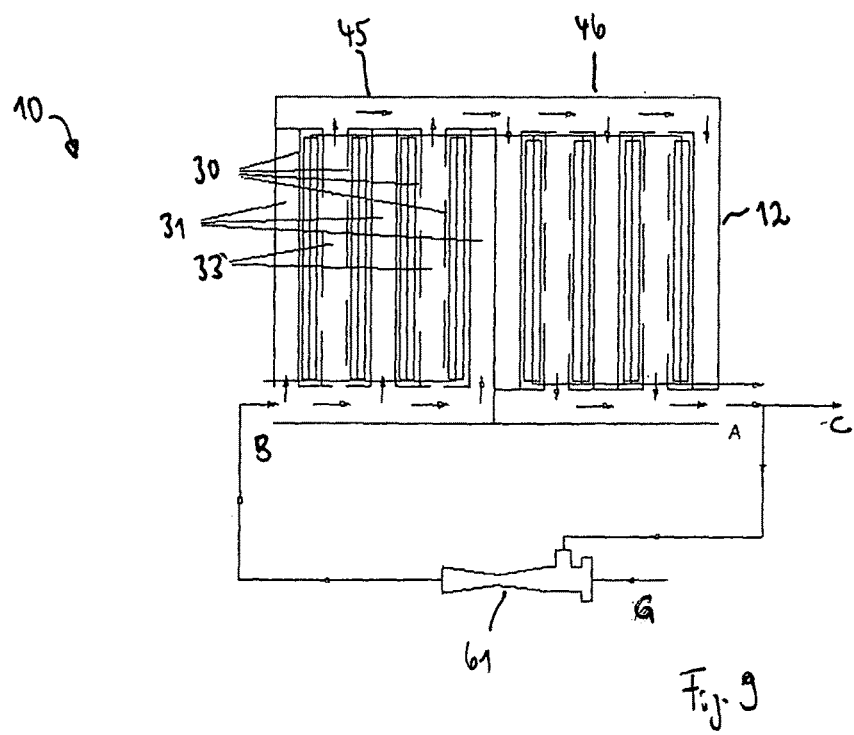
Figure 10:
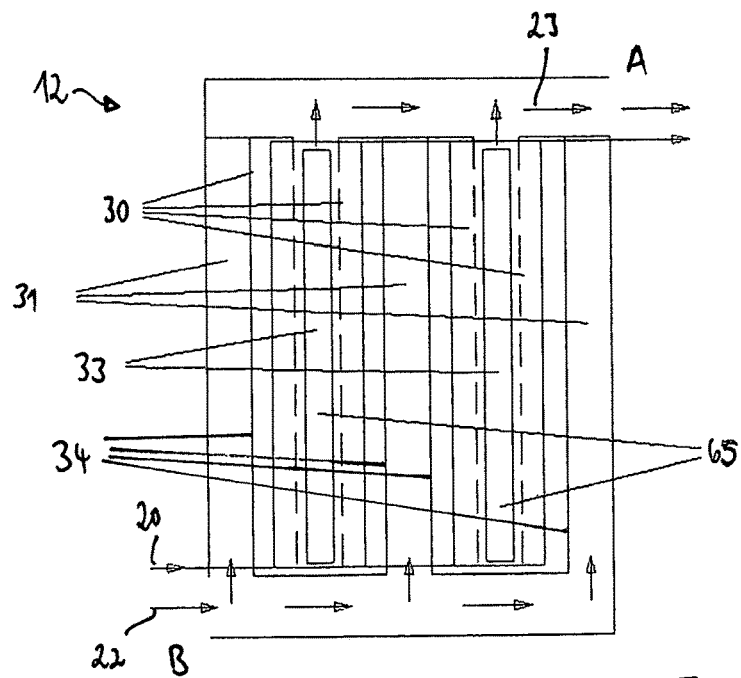
Figure 11:
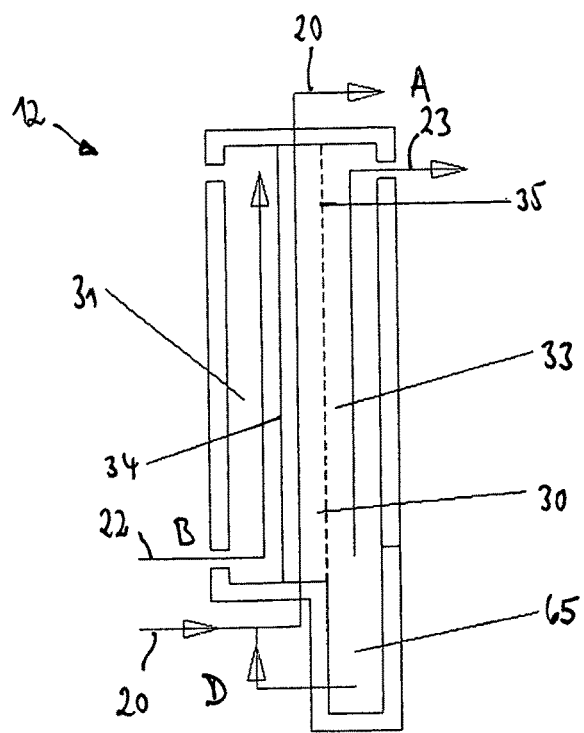

The invention will be explained in more detail in the following with reference to embodiments and to the drawings. There are shown in these:

FIG. 1: a schematic representation of an exemplary embodiment of a system for the crystallization of a substance to be crystallized which is dissolved in a solvent having a pre-crystallizer, a post-crystallizer, a separator and a cooler;

FIG. 2: a schematic representation of an exemplary embodiment of a pre-crystallizer having a flow passage conducting the solution to be concentrated, a flow passage conducting the heating steam and a flow passage conducting the vaporous solvent;

FIG. 3: a schematic representation of an exemplary embodiment of a pre-crystallizer having a liquid collection tank adjoining the flow passage conducting the vaporous solvent at the bottom;

FIG. 4: a schematic representation of an exemplary embodiment of a single-stage pre-crystallizer having a plurality of parallel flow passages;

FIG. 5: a schematic representation of an exemplary embodiment of a two-stage pre-crystallizer having a plurality of parallel flow passages in a plan view;

FIG. 6: a schematic representation of an exemplary embodiment of a two-stage pre-crystallizer having a plurality of parallel flow passages in a side view;

FIG. 7: a schematic representation of an exemplary embodiment of a system for the crystallization of a substance to be crystallized which is dissolved in a solvent having a pre-crystallizer, a post-crystallizer, a separator and a cooler;

FIG. 8: a schematic representation of an exemplary embodiment of a system for the crystallization of a substance to be crystallized which is dissolved in a solvent having a pre-crystallizer and a mechanical compressor;

FIG. 9: a schematic representation of an exemplary embodiment of a system for the crystallization of a substance to be crystallized which is dissolved in a solvent having a pre-crystallizer and a thermal compressor;

FIG. 10 a schematic representation of an exemplary embodiment of a pre-crystallizer having a volume for the collection of solution to be concentrated in a plan view; and FIG. 11 a schematic representation of an exemplary embodiment of a pre-crystallizer having a volume for the collection of solution to be concentrated in a side view.

FIG. 1 shows in a schematic representation an exemplary embodiment of a system 10 for the crystallization of a substance to be crystallized which is dissolved in a solvent. In this respect, the solvent can, for example, be water and the substance dissolved therein can, for example, be salt.

The system 10 comprises a crystallization apparatus 11 which comprises a heated pre-crystallizer 12, a post-crystallizer 13 and a separator 14 as well as a cooler 15. A solution 20 which is to be concentrated and which includes the solvent having the substance to be crystallized dissolved therein is conducted through the pre-crystallizer 12, the post-crystallizer 13 and the separator 14. In this respect, a crystallization of the substance dissolved in the solution 20 to be concentrated is achieved by a concentration increase in the pre-crystallizer 12 and a cooling in the post-crystallizer 13. The created crystals 21 are separated in the pre-crystallizer 12, in the post-crystallizer 13 and in the separator 14.

The pre-crystallizer 12 is heated by means of a heating steam 22 or a heating liquid. A proportion of the solvent is evaporated in the pre-crystallizer 12 during the operation of the system 10—as will be explained in detail in the following. Vaporous solvent 23 which arises in this respect is supplied to the cooler 15 in which it is condensed and led off as condensate 24. The cooler 15 is flowed through by a cooling medium 25.

FIG. 2 shows in a plan view a schematic representation of an exemplary embodiment of a pre-crystallizer 12.

The pre-crystallizer 12 comprises a flow passage 30 conducting the solution 20 to be concentrated, a flow passage 31 conducting the heating steam 22 and a flow passage 33 conducting the vaporous solvent 23. A heating liquid can also be used instead of the heating steam 22. The pre-crystallizer furthermore includes a steam-impermeable and liquid-impermeable wall 34 as well as a membrane wall 35 permeable to the vaporous solvent 23, but not to the liquid solvent.

The flow passage 30 conducting the solution 20 to be concentrated and the flow passage 31 conducting the heating steam 22 are arranged adjacent to one another and are at least partly separated from one another by the steam-impermeable and liquid-impermeable wall 34. In addition, the flow passages 30 and 31 are directly adjacent to oppositely disposed sides of the wall 34.

The flow passage 30 conducting the solution 20 to be concentrated and the flow passage 33 conducting the vaporous solvent 23 are arranged adjacent to one another and are at least partly separated from one another by the liquid-impermeable and steam-permeable membrane wall 35. In addition, the flow passages 30 and 33 are directly adjacent at oppositely disposed sides of the membrane wall 35.

Furthermore, the wall 34 and the membrane wall 35 are located at oppositely disposed sides of the flow passage 30 conducting the solution 20 to be concentrated.

The heating steam 22 enters into the pre-crystallizer 12 at a point B and transfers energy through the heat conductive wall 34 to the solution 30 to be concentrated which flows through the flow passage 30, whereby the solution 20 to be concentrated is heated and is finally boiled. To achieve the boiling of the solution 20 to be concentrated in the flow passage 30 at the temperature effected by the heating steam 22, the hydrostatic pressure of the solution 20 to be concentrated is lowered so far, for example, that the boiling pressure corresponding to the temperature of the solution 20 to be concentrated is reached.

Provided that the flow passage 30 conducting the solution 20 to be concentrated is arranged vertically, the boiling of the solution 20 to be concentrated takes place as is explained in the following.

The flow passage 30, which is bounded at one side by the steam-impermeable and liquid-impermeable wall 34 and at the other side by the liquid-impermeable and steam-permeable membrane wall 35, always has a minimum height in a technical embodiment. The hydrostatic pressure of the solution 20 to be concentrated is reduced when the boiling takes place starting from the top in the flow passage 30. The specific weight of the solution 20 to be concentrated changes due to the boiling and the boiling continues vertically downwardly in the flow passage 30.

Without further measures, the solution 20 to be concentrated would cool down due to the evaporation of the solvent and the pressure in the flow passage 30 would have to be lowered ever further to maintain the boiling. Since, however, heating steam 24 can continue to flow via the flow passage 31, which is adjacent to the flow passage 30 which conducts the solution 20 to be concentrated via the steam-impermeable, liquid-impermeable wall 34, and can condense at the steam-impermeable, liquid-impermeable wall 34, the solution 20 to be concentrated does not cool down in the flow passage 30. The steam created in the flow passage 30 conducting the solution 20 to be concentrated can flow via the liquid-impermeable, steam-permeable membrane wall 35 disposed opposite the steam-impermeable, liquid-impermeable wall 34 into the flow passage 33 which adjoins the membrane wall 35. The vaporous solvent 23 exits the pre-crystallizer 12 at a point A. The condensate 36 produced in the flow passage 31 by condensation of the heating steam 22 is led out of the pre-crystallizer 12 via a suitable flow passage.

The flow passage 33 flowed through by the vaporous solvent 23 is at a lower pressure than the flow passage 31 conducting the heating steam 22. The pressure in the flow passage 33 is preferably equal to the boiling pressure of the pressure loss of the solution 20 to be concentrated adjacent via the membrane wall 35, less the pressure loss caused by the membrane wall 35. If crystallization occurs due to an increasing concentration of the solution 20 to be concentrated, the crystals are kept in movement by the boiling. The boiling of the solution has the result that the steam-impermeable, liquid-impermeable wall 34 and the liquid-impermeable, steam-permeable membrane wall 35 move and crystals which have formed at the surfaces are removed or adhere less strongly.

The flow passage 30 for the solution 20 to be concentrated has an opening at least partly at its lower side and a sediment collection tank 37 adjoins it. The crystals created during the crystallization can be deposited in the sediment collection tank 37. The sediment collection tank 37 is filled with the solution 20 to be concentrated, but is not flowed through by the solution 20 to be concentrated.

The membrane wall 35 can, for example, be manufactured from microporous, hydrophobic substances, for example from polytetrafluorethylene, polypropylene, polyethylene or polyvinylidene fluoride.

The flow passage 30 conducting the solution 20 to be concentrated has a width in the range of 2 mm to 10 mm. The width of the flow passage 30 is defined in the embodiment of the pre-crystallizer 12 shown in FIG. 2 by the spacing of the steam-impermeable, liquid-impermeable wall 34 from the liquid-impermeable, steam-permeable membrane wall 35.

Different flow directions are possible for the inflowing and/or outflowing heating steam 22 and for the vaporous solvent 23 in the flow passages 31 and 33 respectively. The heating steam 22 and the vaporous solvent 23 can flow vertically or horizontally through the flow passages 31 and 33 respectively. The solution 20 to be concentrated can flow horizontally, vertically or diagonally through the flow passage 30. Different connection possibilities thereby result as to how the solution 20 to be concentrated, the heating steam 22 and the vaporous solvent 23 flow in which direction with respect to one another.

It is a possibility to produce the boiling in the flow passage 30 to monitor the inflow and outflow of the solution 20 to be concentrated in the flow passage 30 for the solution 20 to be concentrated. If the solution 20 to be concentrated flows from bottom to top in the flow passage 30, the inflow and outflow of the solution 20 to be concentrated into and out of the flow passage 30 can be achieved via passive elements such as restrictors or active elements such as valves via a cross-sectional change of the line in which the solution 20 to be concentrated flows.

If the solvent of the solution 20 to be concentrated is converted into steam during the boiling, a volume increase takes place with water, for example, by three orders of magnitude at environmental pressure. The steam arising on the phase change will now want to flow off through the line configured for the transport of the liquid solvent 20 to be concentrated. This line has too small a cross-section for the steam flow and thus also too high a pressure loss. If the pressure loss exceeds the pressure loss which the liquid-impermeable, steam-permeable membrane 35 causes on the steam throughflow, the steam produced on the boiling of the solution 20 to be concentrated flows into the flow passage 33, which is provided for the vaporous solvent 23.

Fresh solution 20 to be concentrated flows toward the pre-crystallizer 12. If the pre-crystallizer 12 is operated in a vacuum and with a temperature increase of the solution 20 to be concentrated, non-condensable gases are released from the solution 20 to be concentrated. These gases have to be removed from the system 10.

The crystallization apparatus 11 can be operated in a vacuum or at excess pressure. To separate the crystallization apparatus 11 from the environmental pressure prevailing outside the crystallization apparatus 11, measures known to the skilled person have to be carried out such as the use of pumps, housings and valves in the inflow lines and outflow lines.

The flow of the solution 20 to be concentrated and of the heating steam 22 in the flow passages 30 and 31 respectively can be produced using means familiar to the skilled person such as pumps. The respective flow speed can be set via the pumps.

The solution 20 to be concentrated can already have a concentration of the substance to be crystallized close to saturation on the entry into the flow passage 30 of the pre-crystallizer 12. The concentration of the substance to be crystallized in the flow passage 30 increases due to the reduction of the solvent in the solution 20 to be concentrated, whereby ultimately saturation and oversaturation are achieved and nucleation and crystal growth take place.

FIG. 3 shows in a schematic representation an exemplary embodiment of a pre-crystallizer 10. Unlike the pre-crystallizer 10 shown in FIG. 2, a liquid collection tank 38 is attached to the flow passage 33 conducting the vaporous solvent 23 at the bottom. The solution 20 to be concentrated which has moved in liquid form through the membrane wall 35 from the flow passage 30 into the flow passage 33 is collected in the liquid collection tank 38.

The sediment collection tank and liquid collection tank 37, 38 adjoining the flow passages 30 and 33 at the bottom are separated from one another by a separating wall 39.

FIG. 4 shows in a schematic representation an exemplary embodiment of a pre-crystallizer 12 comprising a stage 45. The stage 45 comprises a plurality of mutually parallel flow passages 30 conducting the solution 20 to be concentrated, a plurality of mutually parallel flow passages 31 conducting the heating steam 22 and a plurality of mutually parallel flow passages 33 conducting the vaporous solvent 23. In the embodiment in accordance with FIG. 4, the stage 45 comprises four flow passages 30, three flow passages 31 and two flow passages 33. Alternatively, however, a different number of flow passages 30, 31 and 33 can also be provided. The capacity of the pre-crystallizer 12 is increased by the parallel connection of the flow passages 30, 31 and 33.

The flow passages 30, 31 and 33 are arranged in the stage 45 such that the number of the flow passages 31 and 33 conducting the heating steam 22 and the vaporous solvent 23 is as small as possible. Two flow passages 30 conducting the solution 20 to be concentrated are associated with the middle one of the flow passages 31 conducting the heating steam 22; they are arranged at oppositely disposed sides of the middle flow passage 31 and are respectively separated from the middle flow passage 31 by a steam-impermeable and liquid-impermeable wall 34.

Two respective flow passages 30 conducting the solution 20 are furthermore associated with the flow passages 33 conducting the vaporous solvent 23; they are arranged at oppositely disposed sides of the respective flow passage 33 and are respectively separated from the flow passage 33 by a liquid-impermeable and steam-permeable membrane wall 35.

FIG. 5 shows in a schematic representation an exemplary embodiment of a pre-crystallizer 12 which comprise a stage 45 and a stage 46 connected downstream of the stage 45. The stage 45 corresponds to the stage 45 in FIG. 4. In addition, the stage 45 also includes flow passages 47 which lead off the condensate of the heating steam 22 forming in the flow passages 31 of the stage 45 out of the stage 45 at a point H.

The stage 46 having a plurality of mutually parallel flow passages 30, 31 and 33 is of a similar structure to stage 45. In this respect, the flow passages 31 of the stage 46 are connected to the flow passages 33 of the stage 45. The vaporous solvent 23 produced in the stage 45 thus serves for the heating of the solution 20 to be concentrated in the flow passages 30 in the stage 36. The vaporous solvent 23 produced in the stage 45 condenses in the flow passages 31 of the stage 46 and exits the stage 46 as condensate over flow passages 48.

The solution 20 to be concentrated initially runs through the flow passages 30 of the stage 45 and subsequently through the flow passages 30 of the stage 46. The flow passages 30 are added together in length due to the consecutive connection of the stages 45 and 46 and the flow lengths required for the sedimentation can be achieved in a simple manner.

FIG. 6 shows in a side view a schematic representation of an exemplary embodiment of a pre-crystallizer 12 which has a stage 45 and a stage 46 connected downstream of the stage 45 as well as a stage 49 connected downstream of the stage 46. A respective deflection unit 52 and 53 is arranged between respective adjacent stages 45, 46 and 49, i.e. between the stages 45 and 46 as well as between the stages 46 and 49. The solution 20 to be concentrated enters into the stage 45 from below and is brought to the boil there by means of the heating steam 22 led into the flow passage 31. The vaporous solvent 23 created in this process enters through the membrane wall 35 of the stage 45 and moves into the flow passage 33 of the stage 45. The vaporous solvent 23 is led from the flow passage 33 of the stage 45 into the flow passage 31 of the stage 46 where it condenses and heats the solution 20 to be concentrated in the flow passage 30 of the stage 46.

The solution 20 to be concentrated enters from above into the deflection unit 52 after exiting the stage 45. The solution 20 to be concentrated is deflected in the deflection unit 52 such that it enters into the stage 46 from below. The stage 46 has exactly the same structure as stage 45 in principle. The deflection unit 53 which has the same structure as the deflection unit 52 is connected downstream of the stage 46. The stage 49 arranged downstream of the deflection unit 53 has in principle the same structure as the stages 45 and 46. It is conceivable to arrange further deflection units and stages alternately after the stage 49.

The flowing through of the solution 20 to be concentrated in the flow passages 30 can take place diagonally from bottom to top.

A tank 50 is furthermore provided into which the solution 20 to be concentrated flows after leaving the stage 49. The solution 20 to be concentrated is integrated via the tank 50 into a vacuum system 51 which serves to set the boiling pressure corresponding to the temperature of the solution 20 to be concentrated in the flow passages 30.

FIG. 7 shows in a schematic representation an exemplary embodiment of a system 10 for the crystallization of a substance to be crystallized which is dissolved in a solvent. The system 10 substantially corresponds to the system 10 shown in FIG. 1 and comprises a pre-crystallizer 12, a post-crystallizer 13, a separator 14 and a cooler 15. The pre-crystallizer 12 is realized in the system 10 shown in FIG. 7 by the pre-crystallizer 12 known from FIG. 2.

The pre-crystallizer 12 in FIG. 7 furthermore includes a liquid collection tank 38 in which the solution 20 to be concentrated collects which has moved by leakage in liquid form through the membrane wall 35 from the flow passage 30 into the flow passage 33. The solution 30 to be concentrated which has collected in the liquid collection tank 38 can be supplied to the flow passage 30 of the pre-crystallizer 12 in part again at a point D, but can also be at least partly led off out of the system 10 at a point F.

The vaporous solvent 23 arising in the pre-crystallizer 12 is conducted into the cooler 15 and condenses there. The cooler 15 is flowed through by a cooling medium 25 for this purpose. After the exit from the cooler 15, at least some of the heated cooling medium 25 is led into the post-crystallizer 13. The solution 20 to be concentrated flowing out of the pre-crystallizer 12 is cooled there with the aid of the cooling medium 25. Since the solubility of the substance dissolved in the solution 20 to be concentrated is temperature-dependent, a further crystallization is produced by the cooling of the solution 20 to be concentrated in the post-crystallizer 13.

From the post-crystallizer 13, the solution 20 to be concentrated moves into the separator 14 which, for example, includes a filter, a fine-mesh screen or a cyclone with which further crystals can be removed from the solution 20 to be concentrated.

FIG. 8 shows in a schematic representation an exemplary embodiment of a system 10 for the crystallization of a substance to be crystallized which is dissolved in a solvent having a pre-crystallizer 12 such as is shown in FIG. 2. Unlike the system 10 from FIG. 7, the system 10 shown in FIG. 8 does not include a cooler. The vaporous solvent 23 produced in the pre-crystallizer 12 is instead supplied to a mechanical compressor 60, for example to a vapor recompression evaporator. The compressor 60 increases the temperature and the pressure of the vaporous solvent 23 and supplies the heated and compressed vaporous solvent as heating steam 22 to the flow passage 31 of the pre-crystallizer.

Instead of a single-stage pre-crystallizer 12, a multi-stage pre-crystallizer such as is shown in FIG. 5 or 6 can also be used in the system 10 shown in FIG. 8.

FIG. 9 shows in a schematic representation an exemplary embodiment of a system 10 for the crystallization of a substance to be crystallized which is dissolved in a solvent having a multi-stage pre-crystallizer 12 such as is shown in FIG. 5. Here, the outlet of the pre-crystallizer 12 is connected at the point A to the inlet of the pre-crystallizer at the point B via a thermal compressor, for example a thermal vapor recompression (TVR) evaporator 61 which increases the temperature and the pressure of the steam.

Some of the steam flow off via an outlet at a point C and is condensed, for example, via a downstream condenser. Motive steam is supplied to the thermal vapor recompression evaporator 61 at a point G.

FIG. 10 shows in a schematic representation an exemplary embodiment of a pre-crystallizer 12 which has a similar structure to the pre-crystallizer 12 shown in FIG. 4. Unlike in FIG. 4, however, the flow passages 33 bounded by the membrane walls 35 and conducting the vaporous solvent 23 are downwardly open via passages 65 here and end in a closed volume. The flow passages 31 bounded by the steam-impermeable, liquid-impermeable walls 34 and conducting the heating steam 22 are downwardly closed in the pre-crystallizer 12 shown in FIG. 10.

If a leakage occurs at one of the membrane walls 35, that is the solution 20 to be concentrated passes through the membrane wall 35 in a liquid state, the solution 20 to be concentrated can flow downwardly into the passages 65, can collect in the downwardly adjoining volume and can again be supplied into the flow passages 30.

In the embodiment shown in FIG. 10, the heating steam 23 entering into the pre-crystallizer 12 at the point B and the vaporous solvent 23 exiting the pre-crystallizer 12 at the point A flow vertically by way of example. The solution 20 to be concentrated likewise flows vertically in this embodiment. The condensate which forms at the steam-impermeable, liquid-impermeable walls 34 is led horizontally outwardly out of the flow passages 31.

FIG. 11 shows the embodiment of the pre-crystallizer 12 in accordance with FIG. 10 in the side view. The passage 65 extends downwardly from the flow passage 33. The solution 20 to be concentrated which comes from a leakage and which flows into the flow passage 33 can flow through the passage 65 into the volume. At the point D, the collected solution 20 to be concentrated which comes from the leakage can be added to the solution 20 to be concentrated which flows into the pre-crystallizer 12.

REFERENCE NUMERAL LIST

10 system
11 crystallization apparatus
12 pre-crystallizer
13 post-crystallizer
14 separator
15 cooler
20 solution to be concentrated
21 crystals
22 heating steam
23 vaporous solvent
24 condensate
25 cooling medium
30 flow passage
31 flow passage
33 flow passage
34 wall
35 membrane wall
36 condensate
37 sediment collection tank
38 liquid collection tank
39 dividing wall
45 stage
46 stage
47 flow passage
48 flow passage
49 stage
50 tank
51 vacuum system
52 deflection unit
53 deflection unit
60 compressor
61 thermal vapor recompression evaporator
65 passage

The invention claimed is:

1. A system for crystallization of a substance to be crystallized which is dissolved in a solvent, the system comprising a crystallization apparatus which is flowed through by a solution to be concentrated having the substance to be crystallized dissolved therein, and which is flowed through by a heating steam or a heating liquid, wherein the crystallization apparatus comprises:
   at least one flow passage conducting the solution to be concentrated,
   at least one flow passage conducting the heating steam or the heating liquid, and
   at least one flow passage conducting vaporous solvent, wherein a respective flow passage conducting the solution to be concentrated is at least partly separated from a respective flow passage conducting the heating steam or the heating liquid by a steam-impermeable and liquid-impermeable wall and wherein a respective flow passage conducting the solution to be concentrated is at least partly separated from a respective flow passage conducting the vaporous solvent by a membrane wall permeable to the vaporous solvent, but not to the liquid solvent, wherein the crystallization apparatus is configured such that the solution to be concentrated is boiled in the respective flow passage conducting the solution to be concentrated and vaporous solvent produced during the boiling moves through the membrane wall into the adjacent flow passage conducting the vaporous solvent, wherein the respective flow passage conducting the solution to be concentrated has a width of at least 3 mm, and a sediment collection tank is arranged at a lower side of the respective flow passage conducting the solution to be concentrated at the bottom so as to collect crystals produced in the crystallization apparatus.

2. The system in accordance with claim 1, wherein the flow passage conducting the solution to be concentrated has a width of no more than 10 mm.

3. The system in accordance with claim 1,
wherein a liquid collection tank adjoins the respective flow passage conducting the vaporous solvent at the bottom for collecting the solution to be concentrated that has moved through the membrane wall.

4. The system in accordance with claim 3,
wherein the liquid collection tank is separated from the sediment collection tank by a dividing wall.

5. The system in accordance with claim 1,
wherein the crystallization apparatus comprises:
   a plurality of mutually parallel flow passages conducting the solution to be concentrated,
   a plurality of mutually parallel flow passages conducting the heating steam or the heating liquid, and
   a plurality of mutually parallel flow passages conducting the vaporous solvent.

6. The system in accordance with claim 5,
wherein two of the mutually parallel flow passages conducting the solution to be concentrated are arranged at oppositely disposed sides of the respective flow passage conducting the heating steam or the heating liquid.

7. The system in accordance with claim 1,
wherein the crystallization apparatus has a plurality of stages which are connected consecutively, wherein each stage has:
   at least one flow passage conducting the solution to be concentrated,
   at least one flow passage conducting the heating steam or the heating liquid, and
   at least one flow passage conducting the vaporous solvent, and wherein the at least one flow passage of one of the stages conducting the vaporous solvent is connected to the at least one flow passage of the following stage conducting the heating steam or the heating liquid.

8. The system in accordance with claim 1,
wherein the system comprises a compressor, wherein an inlet of the compressor is connected to an outlet of the at least one flow passage conducting the vaporous solvent and an outlet of the compressor is connected to an inlet of the at least one flow passage conducting the heating steam.

9. The system in accordance with claim 8,
wherein the compressor is either a vapor recompression evaporator or a steam ejector.

10. The system in accordance with claim 8,
wherein the compressor increases the temperature and the pressure of the vaporous solvent and supplies it to the at least one flow passage conducting the heating steam.

\* \* \* \* \*